(12) United States Patent
Benedict

(10) Patent No.: US 10,628,787 B2
(45) Date of Patent: Apr. 21, 2020

(54) APPARATUS FOR MANAGING TRANSPORTATION VEHICLES

(71) Applicant: Albert James Benedict, Calgary (CA)

(72) Inventor: Albert James Benedict, Calgary (CA)

( * ) Notice: Subject to any disclaimer, the term of this patent is extended or adjusted under 35 U.S.C. 154(b) by 987 days.

(21) Appl. No.: 14/800,226

(22) Filed: Jul. 15, 2015

(65) Prior Publication Data

US 2016/0189100 A1 Jun. 30, 2016

Related U.S. Application Data

(60) Provisional application No. 62/051,587, filed on Sep. 17, 2014.

(51) Int. Cl.
*G06Q 10/08* (2012.01)
(52) U.S. Cl.
CPC ................. *G06Q 10/0838* (2013.01)
(58) Field of Classification Search
CPC . G06Q 10/0838; G06Q 10/08; G06Q 10/0833
See application file for complete search history.

(56) References Cited

U.S. PATENT DOCUMENTS

| | | | | |
|---|---|---|---|---|
| 3,061,134 | A * | 10/1962 | Fesmire | B61D 3/20 220/1.5 |
| 5,200,735 | A * | 4/1993 | Hines | G08B 25/10 340/539.11 |
| 9,710,777 | B1 * | 7/2017 | Sheykh-Zade | G06Q 10/083 |
| 2006/0088042 | A1 * | 4/2006 | Shoham | H04W 4/12 370/401 |
| 2009/0021369 | A1 * | 1/2009 | Ulrich | G06Q 10/087 340/539.13 |
| 2010/0172502 | A1 * | 7/2010 | Jones | G06K 17/0029 380/277 |

(Continued)

FOREIGN PATENT DOCUMENTS

WO WO2014009778 * 1/2014 ............ G06Q 10/08

OTHER PUBLICATIONS

Nuno Monteiro, A Framework for a Multimodal Transportation Network: an AgentBased Model Approach, 2014, p. 1-2 (Year: 2014).*

*Primary Examiner* — Kevin H Flynn
*Assistant Examiner* — Ibrahim N El-Bathy
(74) *Attorney, Agent, or Firm* — Adrian D. Battison; Ade & Company Inc.; Michael R. Williams

(57) ABSTRACT

Apparatus for managing transportation vehicles includes a plurality of containers each attached to a respective one of the vehicles and containing a memory, a wireless transmitter, a receiver and a writer for storing data in the memory, where data includes a secure section of data defining for the vehicle cargo packing slip information and a non-secure section of data defining for the vehicle safety information relating to the current vehicle contents. The apparatus further includes a first reader for receiving the data in the secure section and second portable reader for receiving the data in the non-secure section where the second reader is arranged to provide to a person in possession of the second reader only data from the non-secure section defining for the vehicle said safety information relating to the current vehicle contents and not the data from the secure section.

15 Claims, 1 Drawing Sheet

(56) References Cited

U.S. PATENT DOCUMENTS

| | | | |
|---|---|---|---|
| 2014/0089030 A1* | 3/2014 | Bell | G06Q 10/06313 |
| | | | 705/7.23 |
| 2014/0143169 A1* | 5/2014 | Lozito | G06O 50/28 |
| | | | 705/333 |
| 2016/0048800 A1* | 2/2016 | Whitten | G06Q 10/0833 |
| | | | 705/333 |

* cited by examiner

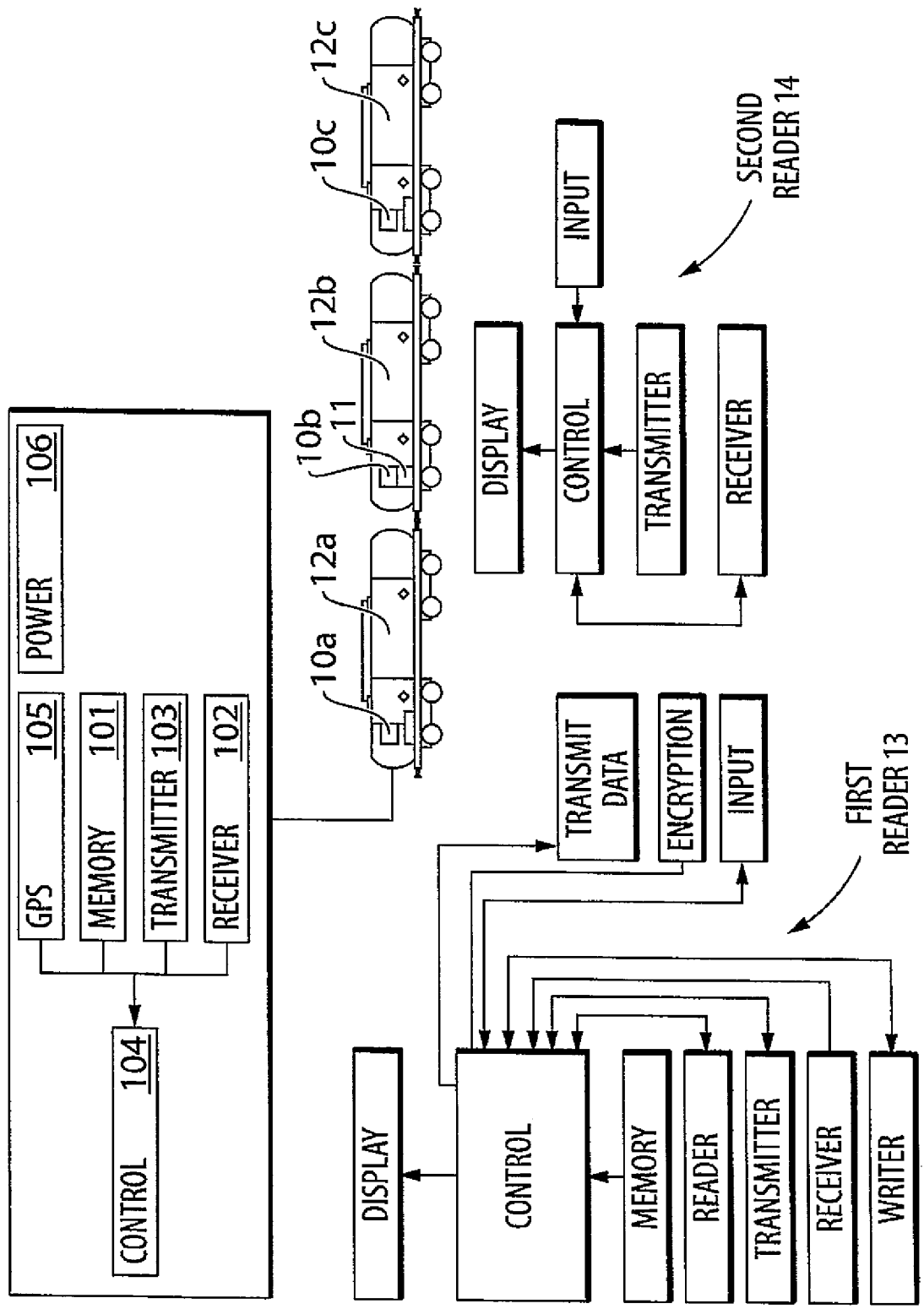

APPARATUS FOR MANAGING TRANSPORTATION VEHICLES

This application claims eh benefit under 35 USC 119 (e) of Provisional Application 62/051,587 filed Sep. 17, 2014.

This invention relates to apparatus for managing transportation vehicles including rail cars, road transportation cars such as tankers, barges and the like.

SUMMARY OF THE INVENTION

According to the invention there is provided an apparatus for managing transportation vehicles comprising:

a plurality of container each having a mounting arrangement for attachment to a respective one of the vehicles;

the container containing:

a memory for storing received information;

a transmitter for wirelessly transmitting required information from the memory when requested;

a receiver for receiving a wireless request signal;

a power supply;

a writer for storing data in the memory, the data including:

a secure section of data defining for the vehicle cargo packing slip information;

a non-secure section of data defining for the vehicle safety information relating to the current vehicle contents;

a first reader device for receiving the data in the secure section in response to a request signal sent by the first reader device and arranged to provide to an authorized person the vehicle cargo packing slip information;

and second portable reader device for receiving the data in the non-secure section in response to a request signal sent by the second reader device;

the second reader device being arranged to provide to a person in possession of the second reader device only data from the non-secure section defining for the vehicle said safety information relating to the current vehicle contents and not the data from the secure section.

Preferably the container includes a GPS system for detecting a current location of the container.

Preferably the transmitter has a range greater than one mile and preferably of the order of five miles.

Preferably the first reader device comprises a read/write device for writing the secure and non-secure sections of the data.

Preferably the secure section is rendered secure to the second reader device by encryption. However the secure section can be rendered secure by allowing it to be transmitted only in response to a request signal from the first reader device.

Preferably the secure section is encrypted by the data writer which enters the data into the memory.

Preferably the secure section is decrypted by the first reader device.

Preferably the vehicle cargo packing slip information includes: the waybill, the bill of lading, loading and offloading instructions, product description and hazardous materials warnings.

Preferably the vehicle safety information includes: the vehicle identification, a load-empty status, current and/or previous cargo description and code, and emergency contact information.

Preferably the first reader device is arranged to be located at a loading access terminal so that the secure information is accessible only at the terminal for use by the shipper at the loading terminal and to the consignee at the receiving terminal.

Preferably the second reader device is arranged to be portable so as to be carried by first responders accessing the vehicles in an emergency.

Preferably the first reader device is arranged to provide an output of all vehicles within the transmitter range to indicate imminent arrival of the vehicles at the location of the first reader device. In this case the container can include a GPS system for detecting a current location of the container on the vehicles and transmitting it to the reader device.

The vehicle can be a rail car, road tanker or a barge.

Preferably the container comprises an exterior weather proof and secure shell which is resistant to tampering.

The arrangement described herein therefore provides a method of attaching a virtual packing slip to a moving vehicle whereby the loading terminal can convey information relating to the cargo aboard so that the receiving terminal and points along the way can have access to shipping information directly from the vehicle.

The cargo packing slip information, including but not limited to the waybill, the bill of lading, loading and offloading instructions, product description, hazardous materials warnings, is electronically stored in a wireless device, providing the onboard device, to be attached to the moving vehicle. This wireless device has the capability of communicating by radio signals to stationary communications boxes, or "access points". The loading terminal access point is able to transfer or "download" the packing slip information into read/write memory into the onboard device. The receiving terminal, or cargo offloading terminal, can transfer the packing slip utilizing a local access terminal and capture the information into appropriate applications used for accounting, product inventory, sales and similar functions.

The advantage with this process is that the packing slip information travels with the cargo and vehicle without the need for a physical paper or manual attachment of material or information to the vehicle. The receiving terminal is assured that the cargo information is correct and complete, as it has travelled with the cargo, rather than arriving indirectly by mail, facsimile or by electronic internet means.

The packing slip information and other safety information is stored in read/write memory inside the onboard device. The information is held in two memory areas; one area is a non-secure area for basic cargo information, the other area is a secure data encrypted section.

The non-secure memory area contains the non-confidential information on the shipment, such as railcar or truck-trailer identification, load-empty status, current or previous cargo description and code, and any emergency contact information.

The secure memory area contains any contract confidential information that is only to be visible to the shipper at the loading terminal and to the consignee at the receiving terminal.

This patent has further benefit to first responders. For example, emergency crews who are called out for incidents on railcars have no way to determine what is on board the railcars, other than through the placards attached to the railcars. The placards may already be damaged or in a hazardous condition, or might even be incorrect. If the first responders have an access point available to them, they are able to remotely read the packing slip on each railcar, before approaching the incident area and be better positioned to set up an emergency response plan.

It is therefore an objective to have every rail tank car in North America to be equipped with an onboard device, as a safety feature, and to have access points at all rail loading and offloading terminals for the interchange of electronic packing slips. The arrangement herein can protect the business process of uploading, conveying and downloading of the information inside the onboard device.

There are over 300,000 rail tank cars in North America.

The recent press coverage of shipping hazardous liquid goods by railcar, especially due to the Lac Megantic disaster, is a compelling reason to have this arrangement made available to the market.

First responders require knowledge of the cargo onboard railcars in jeopardy, as there are minimal visible indicators available today.

Municipalities in many communities having rail tracks running through their downtown core want access to the non-confidential information that could be accessed from the onboard packing slip.

Receiving terminals and consignees need confirmation of what is delivered, through an automated, complete and accurate delivery of information that travels with the cargo, from origin to destination.

The onboard device also can be used to receive and store data relating to the transportation vehicle on which the device is mounted. This can include but is not limited to static and dynamic data such as mechanical properties of the vehicle including length, height, weight, capacity, wheels, valves and fittings. The device can also record activities such as geo-location, temperature, pressure, speed and other parameters of operation. The information is stored in a time sequence electronic memory for n demand recall suitable for routine maintenance reports for emergency recordings similar in purpose to the "black box" used on an aircraft.

The information can be entered by the reader/writer with the other information stored, or the vehicle may include sensors which allow the data to be obtained and entered by the onboard storage device.

BRIEF DESCRIPTION OF THE DRAWINGS

One embodiment of the invention will now be described in conjunction with the accompanying drawings in which:

FIG. 1 is a schematic illustration of a system according to the present invention.

DETAILED DESCRIPTION

The apparatus disclosed herein for managing transportation vehicles includes a series of separate containers 10A, 10B, 10C each having a mounting arrangement 11 for attachment to a respective one of the vehicles 12A, 12B, 12C at a suitable location on the vehicle where it can be maintained safely from damage or tampering but is readily accessible on the exterior for repair.

The system further includes first reader devices 13 to be located at the shipping location and at the receiving location and second reader devices 14 which are portable and can be carried by persons requiring information as to the contents of the vehicles such as inspection persons or first responders.

Each container 10 includes a memory 101 for storing received information, a transmitter 103 for wirelessly transmitting required information from the memory when requested, a receiver 104 for receiving a wireless request signal, a power supply 107 and a control unit 104 which operates the functions and acts to write data into the memory and to retrieve it from the memory when required, all stored within a secure outer shell 106. The control unit 104 acts as a reader/writer for storing data in the memory 101. The data includes a secure section of data defining for the vehicle cargo packing slip information and a non-secure section of data defining for the vehicle safety information relating to the current vehicle contents;

The first reader device is a read/write device with encryption and can receive both the data in the secure section and the non-secure section in response to a request signal sent by the first reader device and is arranged to provide to an authorized person operating the device the vehicle cargo packing slip information by decrypting the data received.

The second portable reader device 14 is arranged for receiving the data in the non-secure section so that it either does not receive the secure data or cannot decrypt the data if received, in response to a request signal sent by the second reader device The second reader device is arranged to provide to a person such as the first responder in possession of the second reader device which is portable so as to be carried by first responders accessing the vehicles in an emergency only data from the non-secure section defining for the vehicle said safety information relating to the current vehicle contents and not the data from the secure section.

In one mode of operation of the first reader device, it is arranged to provide an output on a display of all vehicles within the transmitter range to indicate imminent arrival of the vehicles at the location of the first reader device. This can be operated with the GPS system for detecting a current location of the container on the vehicles to be transmitted and displayed.

As shown the vehicle is a rail car but can be a road tanker, barge or other transportation device of bulk materials such as oil.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus comprising:
   a plurality of transportation vehicles each arranged to transport contents contained therein;
   a plurality of containers each having a mounting arrangement by which the container is attached to a respective one of the transportation vehicles;
   the container containing a data control system comprising:
      a memory for storing received information;
      a transmitter for wirelessly transmitting required information from the memory when requested;
      a receiver for receiving a wireless request signal;
      a power supply;
   a writer for storing data in the memory, the writer being arranged to create in the memory of a respective one of the transportation vehicles data including:
      a secure section of data defining for the respective one of the transportation vehicles cargo packing slip information;
      a non-secure section of data defining for the respective one of the transportation vehicles safety information relating to the contents currently contained in the respective transportation vehicle;
   at least one first reader device arranged to generate a first request signal sent by the first reader device to the receiver of the data control system;

and a plurality of second portable reader devices each arranged to generate a second request signal sent by the second reader device to the receiver of the data control system;

the first reader device and the data control system operating to transmit to the first reader device in response to said first signal the vehicle cargo packing slip at least said information from the secure section of data for the vehicle which information is disclosed on a first display of the first reader device to an authorized person in possession of the first reader device;

the second reader devices and the data control system operating in response to said second signal to disclose on a second display of the second reader device to a person in possession of the second reader device only data from the non-secure section defining for the vehicle said safety information relating to the current vehicle contents and not the data from the secure section.

2. The apparatus according to claim 1 wherein the container includes a GPS system for detecting a current location of the container.

3. The apparatus according to claim 1 wherein the transmitter has a range greater than one mile.

4. The apparatus according to claim 1 wherein the first reader device comprises said writer for writing the secure and non-secure sections of the data.

5. The apparatus according to claim 1 wherein the data in the secure section is prevented from being disclosed on the second display of the second reader device by encryption.

6. The apparatus according to claim 5 wherein the data in the secure section is encrypted by said writer which stores the data into the memory.

7. The apparatus according to claim 5 wherein the data in the secure section is decrypted by the first reader device.

8. The apparatus according to claim 1 wherein the vehicle cargo packing slip information includes: a waybill, a bill of lading, loading and offloading instructions, product description and any hazardous materials warnings.

9. The apparatus according to claim 1 wherein the vehicle safety information includes: vehicle identification, load-empty status, current or previous cargo description and code, and emergency contact information.

10. The apparatus according to claim 1 wherein the first reader device is located at a loading access terminal.

11. The apparatus according to claim 1 wherein the second reader device is carried by first responders accessing the vehicles in an emergency.

12. The apparatus according to claim 1 wherein the first reader device is arranged to disclose on said display to said authorized person information from the secure section of data of all of said transportation vehicles within a range of said transmitter to indicate imminent arrival of said transportation vehicles at a location of the first reader device.

13. The apparatus according to claim 12 wherein the container includes a GPS system for detecting a current location of the container.

14. The apparatus according to claim 1 wherein each of the transportation vehicles is one of a rail car, road tanker or barge.

15. The apparatus according to claim 1 wherein the container comprises an exterior weather proof and secure shell.

* * * * *